(12) United States Patent
Takayama et al.

(10) Patent No.: US 7,807,295 B2
(45) Date of Patent: Oct. 5, 2010

(54) BIPOLAR BATTERY AND METHOD OF MANUFACTURING SAME

(75) Inventors: Gen Takayama, Yokohama (JP); Hajime Sato, Yokohama (JP); Kenji Hosaka, Yokosuka (JP)

(73) Assignee: Nissan Motor Co., Ltd., Yokohama-shi, Kangawa (JP)

( * ) Notice: Subject to any disclaimer, the term of this patent is extended or adjusted under 35 U.S.C. 154(b) by 175 days.

(21) Appl. No.: 11/936,159

(22) Filed: Nov. 7, 2007

(65) Prior Publication Data

US 2008/0131775 A1 Jun. 5, 2008

(30) Foreign Application Priority Data

| Nov. 30, 2006 | (JP) | ............................. 2006-324678 |
| Oct. 3, 2007 | (JP) | ............................. 2007-260223 |

(51) Int. Cl.
*H01M 4/00* (2006.01)
(52) U.S. Cl. ...................................... 429/210; 429/247
(58) Field of Classification Search .................. 429/210, 429/247
See application file for complete search history.

(56) References Cited

U.S. PATENT DOCUMENTS

| 2,942,053 A | 6/1960 | Baldwin, Jr. et al. |
| 4,874,681 A | 10/1989 | Rippel |
| 5,902,697 A | 5/1999 | Guindy et al. |
| 5,916,515 A | 6/1999 | Bryan et al. |

FOREIGN PATENT DOCUMENTS

| EP | 1 841 001 A1 | 10/2007 |
| GB | 2 160 704 A | 12/1985 |
| JP | HEI 11-204136 | 7/1999 |
| JP | 2004-185813 A | 7/2004 |
| JP | 2004185813 A * | 7/2004 |
| JP | 2005-340089 A | 12/2005 |
| KR | 1999-028944 | 4/1999 |

\* cited by examiner

*Primary Examiner*—Jane Rhee
(74) *Attorney, Agent, or Firm*—Young Basile

(57) ABSTRACT

Bipolar batteries configured to minimize the introduction of gas bubbles and methods of manufacturing such batteries are taught herein. One bipolar battery includes an electrolyte layer, which includes a plurality of separators having permeability such that the electrolytes can penetrate therein, in a bipolar electrode wherein a cathode is formed at one side of a collector and an anode is formed at another side of the collector. A stack is formed by stacking the electrolyte layers upon one another. The electrolyte layer of the stack has a layer of overlayed separators.

11 Claims, 13 Drawing Sheets

Forming an assembly unit

Forming a bonded body

Casing

Forming an electrode

Arranging an electrolyte

Arranging a sealing material

Arranging a separator

Assembly unit

FIG. 13

Assembly unit

↓

Stacking

↓

Pressing

↓

Forming a sealing layer

↓

Forming an interface

↓

Initial charging

↓

Exhausting a bubble

↓

Integrated stack

BIPOLAR BATTERY AND METHOD OF MANUFACTURING SAME

CROSS-REFERENCE TO RELATED APPLICATION

This application claims priority from Japanese Patent Application Serial No. 2006-324678, filed Nov. 30, 2006, and Japanese Patent Application Serial No. 2007-260223, filed Oct. 3, 2007, each of which is incorporated herein in its entirety by reference

TECHNICAL FIELD

The invention relates generally to a bipolar battery and a method of manufacturing a bipolar battery.

BACKGROUND

Recently, there has been an increased demand to reduce the amount of carbon dioxide in order to protect the environment. In the automobile industry, electric and hybrid electric vehicles have been introduced to reduce the amount of carbon dioxide. In this regard, the use of a bipolar battery has been primarily contemplated as a power source for driving the motors of these vehicles.

Japanese Laid-Open Patent Publication No. (Hei.) 11-204136 discloses a bipolar battery manufactured by preparing an electrolyte layer in a bipolar electrode wherein a cathode is formed at one side of a collector and an anode is formed at another side of the collector and by stacking the electrolyte layers to form a stack.

When forming such a stack, the electrolyte layer having a cathode and an anode (a layer of separator into which the electrolyte penetrates and segments a cathode and an anode, or a layer of electrolyte between the cathode or anode and the separator) is provided in the collector. The electrolyte layers are then stacked upon one another.

BRIEF SUMMARY

Embodiments of the invention provide a bipolar battery that has a superior battery performance by improving the power density by limiting the presence of gas bubbles therein.

One embodiment of a bipolar battery taught herein comprises at least two bipolar electrodes arranged in a stack, each of the electrodes including a cathode formed on one side of a collector and an anode formed on an opposed side of the collector, and a plurality of separators arranged stacked between adjacent electrodes, each of the plurality of separators having a permeability sufficient for an electrolyte to penetrate therein.

Also disclosed herein is a component for use in a bipolar battery. The component comprises a collector, a cathode formed on one side of the collector, an anode formed on an opposite side of the collector, an electrolyte provided on respective surfaces of the anode and the cathode opposite the collector, a first separator layered on the electrolyte on the anode, a second separator layered on the electrolyte on the cathode and charging material. The charging material fills a space between peripheral edges of the collector and the separators such that the charging material peripherally surrounds the cathode and the anode.

Methods of manufacturing a bipolar battery are also taught herein. One method comprises forming a first bipolar electrode including a first cathode formed on one side of a first collector and a first anode formed on an opposed side of the first collector, arranging a first of a plurality of separators on opposed sides of the first bipolar electrode, each of the first of the plurality of separators having a permeability sufficient for an electrolyte to penetrate therein, forming a second bipolar electrode including a second cathode formed on one side of a second collector and a second anode formed on an opposed side of the second collector, arranging a second of a plurality of separators on opposed sides the second bipolar electrode, each of the second of the plurality of separators having a permeability sufficient for the electrolyte to penetrate therein, and stacking the first bipolar electrode and the second bipolar electrode.

BRIEF DESCRIPTION OF DRAWINGS

The description herein makes reference to the accompanying drawings wherein like reference numerals refer to like parts throughout the several views, and wherein:

FIG. 13 is a flow diagram of forming the bonded body shown in FIG. 5;

DETAILED DESCRIPTION OF EMBODIMENTS OF THE INVENTION

In known bipolar batteries, such as that described in Japanese Laid-Open Patent Publication No. (Hei.) 11-204136, the cathode and the anode are provided with the electrolyte, while the separator is overlapped with either the cathode or the anode so as to form a single layer. Thereafter, the layers are stacked. When overlapping the separators, a bubble is introduced and maintained in the electrolyte between the cathode or anode and the separator.

Specifically, when arranging the separator in the electrolyte layer provided to the cathode or anode, a corrugation is formed on the separator to thereby form a micro gap in the electrolyte layer. Alternatively, the bubble is introduced into the electrolyte layer due to overlapping. If the stack is formed with the remained bubble, then it becomes difficult to exhaust the bubble since the cathode and the anode exist at both surfaces of the separator via the electrolyte. Further, when the bubble remains in the stack as described above, a dead space is generated wherein an ion cannot permeate, and an electron cannot move. The dead space may become a main factor for the deterioration of power. This can be a problem when trying to improve the power density.

In contrast, embodiments of the invention provide a bipolar battery that has a superior battery performance by improving the power density through limiting such bubbles.

Figure 1:
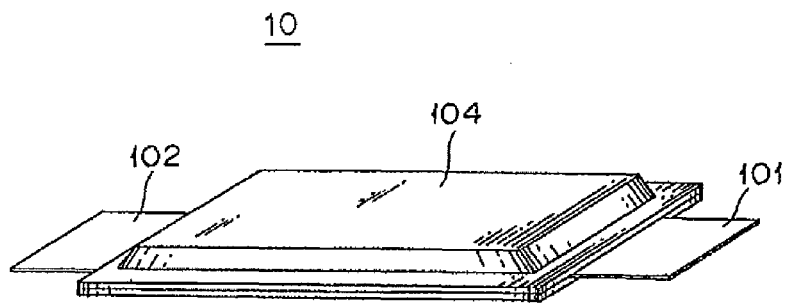
FIG. 1 is a cross-sectional view of a bipolar battery constructed in accordance with a first embodiment of the invention.
Figure 2:
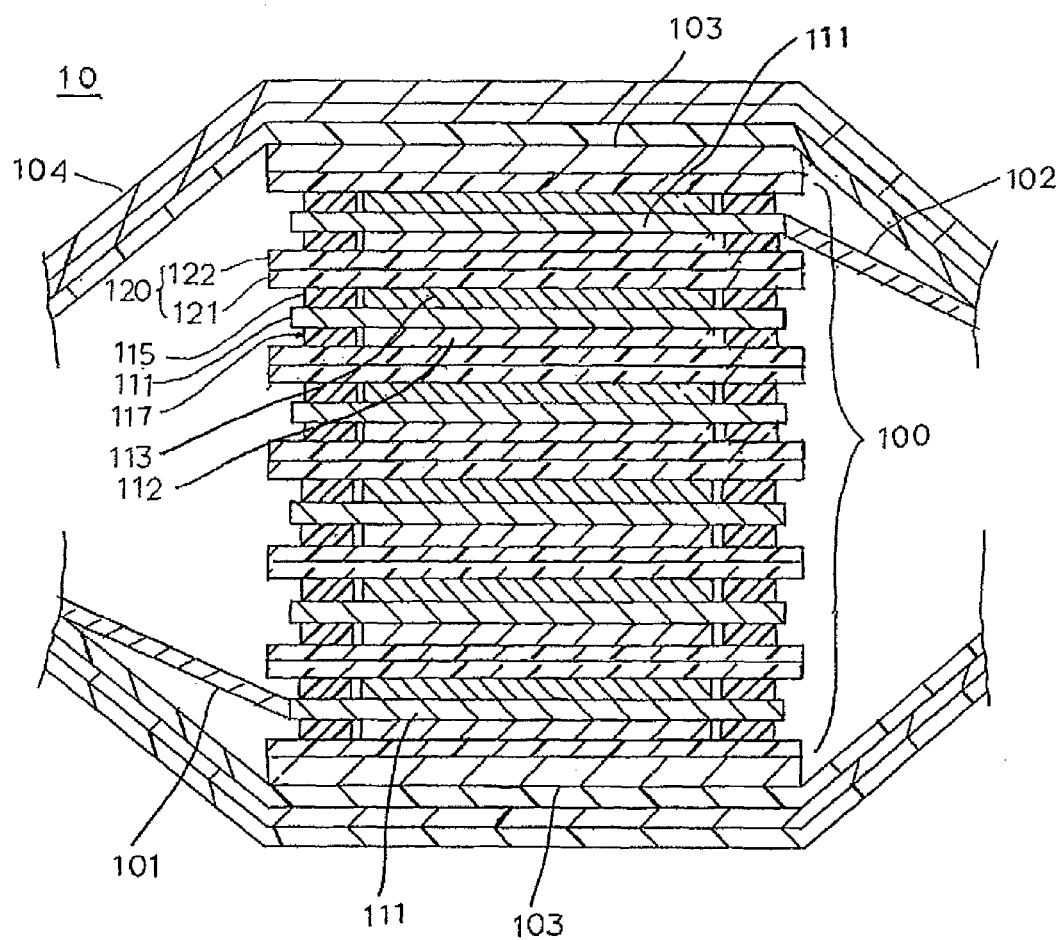
FIG. 2 is a cross-sectional view of the bipolar battery shown in FIG. 1.
Figure 3:
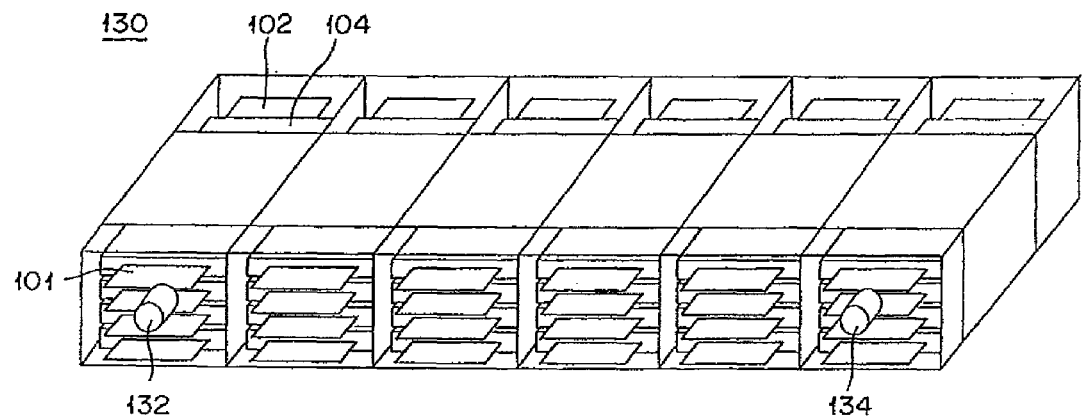
FIG. 3 is a perspective view of a battery assembly configured to use the bipolar battery shown in FIG. 1.
Figure 4:
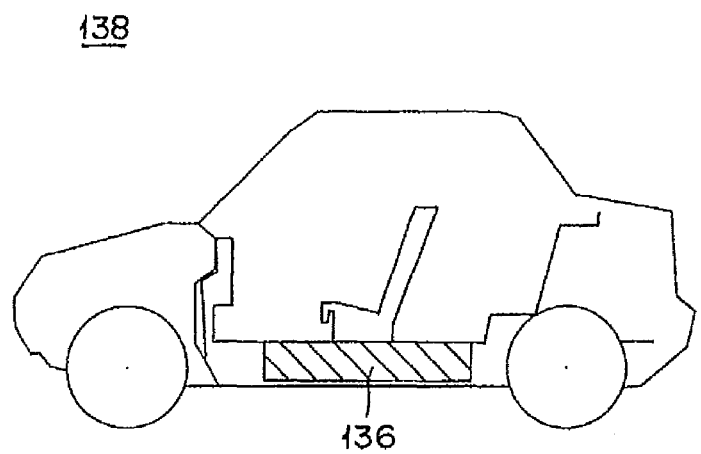
FIG. 4 is a diagram of a vehicle wherein the battery assembly shown in FIG. 3 is mounted.

FIG. 1 is a cross-sectional view of a bipolar battery constructed in accordance with a first embodiment of the invention. FIG. 2 is a cross-sectional view of the bipolar battery shown in FIG. 1. FIG. 3 is a perspective view of a battery assembly configured to use the bipolar battery shown in FIG. 1. FIG. 4 is a diagram of a vehicle wherein the battery assembly shown in FIG. 2 is mounted.

In a bipolar battery 10 constructed in accordance with the first embodiment (shown in FIG. 2), a stack 100 is formed by preparing an electrolyte layer 120 in a bipolar electrode and stacking the electrolyte layers upon one another. The bipolar electrode has an anode 112, a cathode 113 and a collector 111. The cathode 113 is arranged at one side surface of the collector 111, and the anode 112 is arranged at another side surface of the collector 111. That is, the collector 111 is placed between the cathode 113 and the anode 112.

The electrolyte layer 120 has a layer comprising separators 121 and 122, which are stacked upon one another (two sheets), and a layer of electrolyte between the separators 121 and 122 and the cathode 113 or the anode 112. The separators 121 and 122 are porous membranes having permeability for segmenting the cathode 113 or the anode 112, wherein the electrolyte can penetrate into such membranes. The electrolyte can be, for example, a polymer gel electrolyte (gel polymer-based electrolyte).

That is, since the separators 121 and 122 are stacked upon one another in the electrolyte layer 120, although a bubble remains in the electrolyte at the cathode or anode side of the bipolar electrode, it is easy to exhaust such a bubble via the separators 121 and 122. This is because the separators 121 and 122 have permeability such that the electrolyte can penetrate therein from an opposite side surface of the cathode 113 or anode 112. Further, it is also easy to exhaust the bubble from a space between the separators 121 and 122. Unlike the known art where the cathode and anode sides exist at both surfaces of the separator in the electrolyte layer of the stack, making it difficult to exhaust the bubble, in the first embodiment described herein the cathode or anode side exists at one side surface of the separators 121 and 122 in the electrolyte layer 120 of the stack 100, while the separators 121 and 122 exist at another side surface. Accordingly, it is easy to exhaust the remaining bubble from one side surface to another side surface of the separators 121 and 122. It is further easy to exhaust the remaining bubble from a space between the separators 121 and 122.

The bipolar battery 10 also has first and second sealing layers 115 and 117. The first sealing layer 115 is arranged at one side surface of the collector 111 and extended to surround an end of the cathode 113. The electrolyte layer 120 is arranged to cover the cathode 113 and the first sealing layer 115. The second sealing layer 117 is position-adjusted with the first sealing layer 115, thereby being arranged at another side surface of the collector 111 and extended to surround an end of the anode 112. A region wherein the first and second sealing layers 115 and 117 are arranged is referred to as a charging portion.

The collector 111 is, for example, a stainless steel foil. However, the collector 111 is certainly not limited thereto and may include an aluminum foil, a clad material of nickel and aluminum, a clad material of copper and aluminum, or a plating material of a combination of the these metals.

An anode active material of the anode 112 is, for example, a hard carbon (a non-graphitized carbon material). The anode active material is certainly not limited thereto since it may include a graphite-based carbon material or a lithium-transition metallic composite oxide. In certain embodiments, the anode active material composed of carbon and the lithium-transition metallic composite oxide is preferable in terms of capacity and power.

A cathode active material of the cathode 113 is, for example, $LiMn_2O_4$, although it is certainly not limited thereto. The lithium-transition metallic composite oxide is desirable in terms of capacity and power.

Thicknesses of the cathode 113 and anode 112 may be set depending on the purpose of use (e.g., emphasis on power or energy) or ion conductivity.

A charging material constituting the first and second sealing layers 115 and 117 is, for example, one-liquid uncured epoxy resin. However, the charging material is not limited thereto and may include other thermosetting resins (polypropylene or polyethylene) or thermoplastic resins. In certain embodiments, it is preferable to select a material having a desired sealing effect depending on the type of application.

A material for each separator 121, 122 in this embodiment can be porous PE (polyethylene) having permeability such that the electrolyte can penetrate into the separator. In certain embodiments, however, the material may include other polyolefins such as PP (polypropylene), a stack in a three-layer structure of PP/PE/PP, polyamide, polyimide, aramide or non-woven fabric. The non-woven fabric includes, for example, cotton, rayon, acetate, nylon or polyester.

A host polymer of the electrolyte is, for example, PVDF-HFP (copolymer of polyvinylidene fluoride and hexafluoropropylene) containing 10% of HFP (hexafluoropropylene) copolymer. However, the host polymer is not limited thereto and may include other polymers without lithium ion conductivity or polymer (solid polymer electrolyte) with ion conductivity. Other polymers without lithium ion conductivity, for example, include PAN (polyacrylonitile) and PMMA (polymethylmethacrylate). A polymer with ion conductivity, for example, is PEO (polyethylene oxide) or PPO (polypropylene oxide).

An electrolytic solution retained in the host polymer includes, for example, an organic solvent composed of PC (propylene carbonate) and EC (ethylene carbonate), and lithium salt ($LiPF_6$) as a support salt. The organic solvent is not limited to PC and EC since it may include other ring-type carbonate classes, chain-type carbonate classes such as dimethylcarbonate and ether classes such as tetrahydrofuran. The lithium salt can alternatively include other inorganic anionic salts and organic anionic salts such as $LiCF_3SO_3$ instead of $LiPF_6$.

As shown generally in FIGS. 1 and 2, the bipolar battery 10 is housed within an exterior case 104 in the form of a stack 100 of a unit bipolar battery, thereby preventing an impact from the outside or environmental deterioration. Terminal leads 101 and 102 composed of a high conductive member are connected to respective collectors 11 placed at the outermost layer of the stack 100. The high conductive member includes, for example, aluminum, copper, titan, nickel, stainless or alloys thereof. Further, the reference number 103 indicates a reinforcing plate.

The terminal leads 101 and 102 extend to an outer portion of the exterior case 104, and each serves as an electrode tab for extracting the current from the stack 100. Further, by arranging an electrode tab of an independent separate member and connecting to the terminal leads 101 and 102 directly or by using a lead, it is possible to extract the current from the stack 100.

To reduce weight and thermal conductivity, the exterior case 104 can be composed of a sheet material such as polymer-metallic composite laminate film wherein metals such as aluminum, stainless, nickel or copper (including alloys thereof) are coated by an insulator such as a polypropylene film. Further, the exterior case 104 is formed by bonding a part or the entire outer periphery of the case via thermal fusion.

It is possible to use the bipolar battery 10 independently. Optionally, for example, it is possible to use the bipolar battery 10 in the form of a battery assembly 130 as shown in FIG. 3. The battery assembly 130 is constituted by serializing and/or parallelizing the bipolar battery 10 and multi-connecting the bipolar batteries 10. The battery assembly 130 has conductive bars 132 and 134. The conductive bars 132 and 134 are connected to the terminal leads 101 and 102 extended from an inner portion of the bipolar battery 10.

When the bipolar battery 10 is connected and constituted, the capacity and voltage can be freely adjusted via an appropriate serialization or parallelization. A connecting method includes, for example, an ultrasonic welding operation, a thermal welding operation, a laser welding operation, a rivet operation, a caulking operation or an electronic beam.

By serializing and/or parallelizing and multi-connecting the battery assemblies 130, it is possible to provide a battery assembly module (a large scale battery assembly) 136 as shown in FIG. 4. Since the battery assembly module 136 can secure a higher power, it is possible, for example, to be mounted as a power source for driving a motor of a vehicle 138. The vehicle includes, for example, an electric vehicle, a hybrid electric vehicle or an electric train.

The battery assembly module 136, for example, can perform very elaborate control such as performing a control of charging in every interior bipolar battery 10 or every battery assembly 130. Accordingly, it is possible to achieve functional improvements such as an extension of driving distance per charging at one time or an extension of lifetime of a battery mounted on a vehicle.

Figure 5:
FIG. 5 is a flow diagram of a method for manufacturing the bipolar battery constructed in accordance with the first embodiment.
Figure 5:

FIG. 5 is a flow diagram of a method for manufacturing a bipolar battery in accordance with the first embodiment. The method includes a step of forming an assembly unit as a sub-assembly unit wherein the electrolyte and the separator are sequentially arranged at both sides of the bipolar electrode, a step of forming a bonded body as an assembly step for forming the stack (bonded body) wherein the assembly units (sub-assembly units) are stacked and integrated and a step of assembling for housing the integrated stack within the exterior case.

Forming the bonded body (assembly step) comprises a stacking step for stacking the bipolar batteries upon one another by interposing the separators, as will be explained below. In the stacking step, since the separators are overlayed with each other wherein the electrolytes can penetrate, it becomes easy to exhaust such a gas bubble left at the cathode or anode side of the bipolar electrode from a surface opposite to the cathode or anode side via the separator, which has a property for the electrolytes to penetrate therein. Further, it is also easy to exhaust the gas bubble from a space between the separators.

That is, only a single layer results in a situation where the cathode and anode sides exist at both surfaces of the separator. This makes it difficult to exhaust the bubble. Here, however, since the cathode or anode side exists at one side surface of the separator and the separator exists at another side surface, it becomes easy to exhaust the remaining bubble from one side surface to another side surface. Further, it is also easy to exhaust the bubble from a space between the separators.

Figure 6:
FIG. 6 is a flow diagram of a process for forming an assembly unit shown in FIG. 5.
Figure 6:
Figure 6:
Figure 6:
Figure 7:
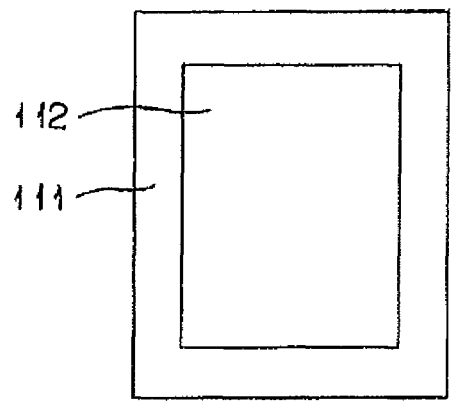
FIG. 7 is a flow diagram of a process for forming an electrode shown in FIG. 6.
Figure 8:
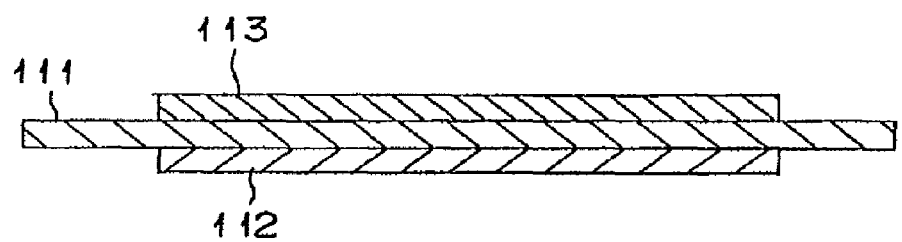
FIG. 8 is a flow diagram of a process for forming an electrode shown in FIG. 6.
Figure 9:
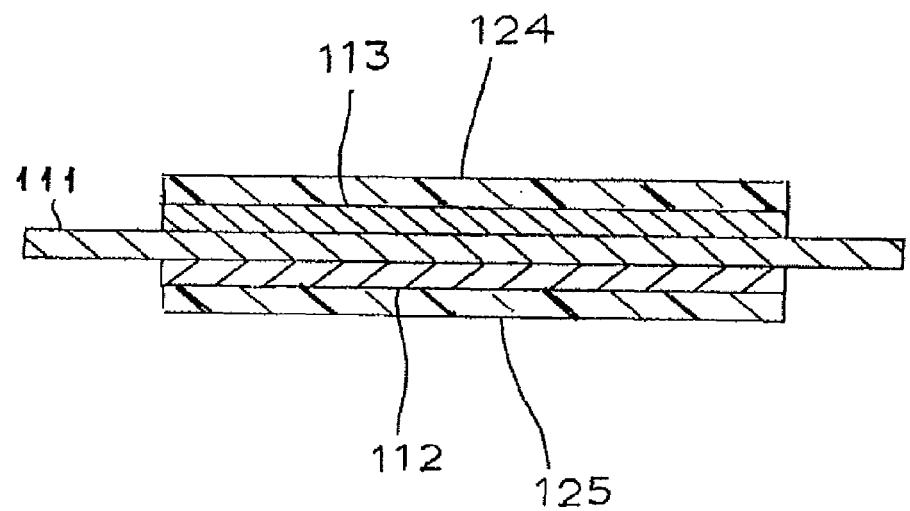
FIG. 9 is a cross-sectional view of a process for arranging an electrode shown in FIG. 6.
Figure 10:
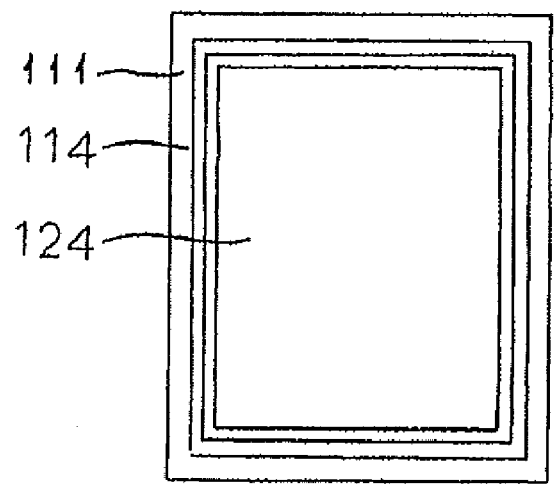
FIG. 10 is a plan view of a process for arranging a sealing material shown in FIG. 6.
Figure 11:
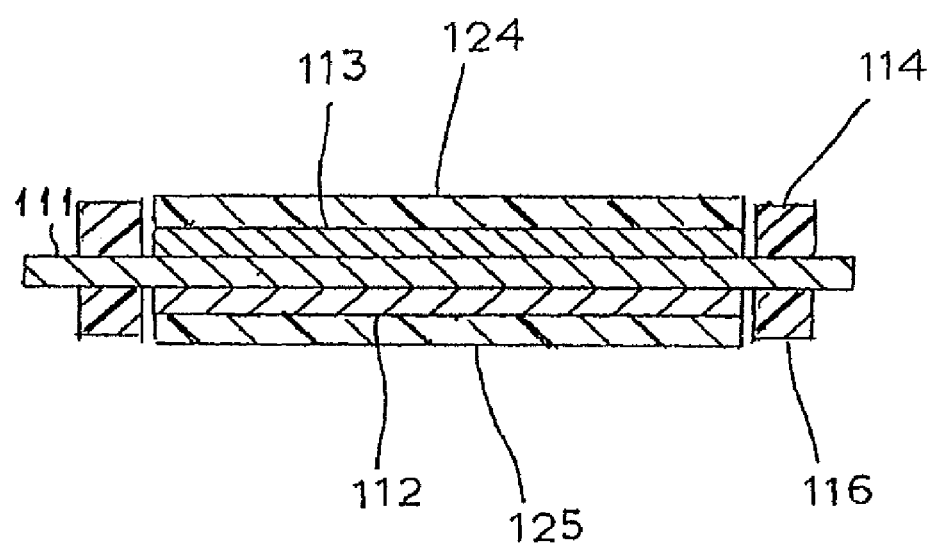
FIG. 11 is a cross-sectional view of a process for arranging a sealing material shown in FIG. 6.
Figure 12A:
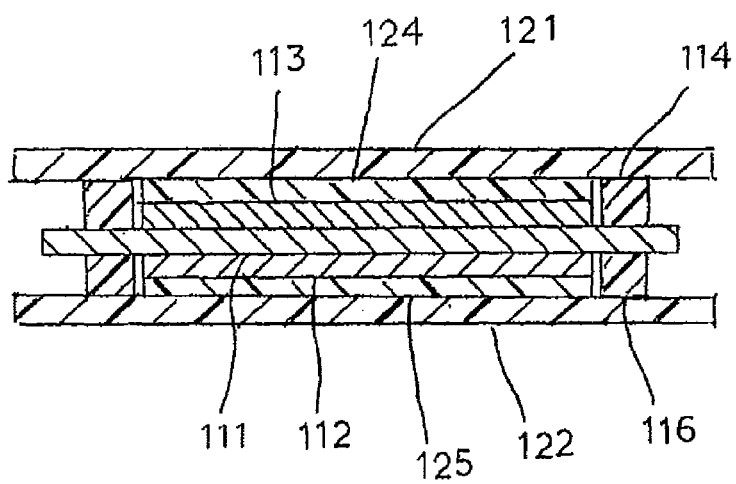
FIG. 12A is a cross-sectional view of the assembly unit and a process for arranging the separator shown in FIG. 6.

FIG. 6 is a flow diagram of the process for forming the assembly unit shown in FIG. 5. FIG. 7 is a plan view of the process for forming the electrode shown in FIG. 6, while FIG. 8 is a cross-sectional view of the process for forming the electrode shown in FIG. 6. FIG. 9 is a cross-sectional view of the process for arranging the electrolyte shown in FIG. 6, while FIG. 10 is a plan view of the process for arranging the sealing material shown in FIG. 6. FIG. 11 is a cross-sectional view of the process for arranging the sealing material shown in FIG. 6. FIG. 12A is a cross-sectional view of the process for arranging the separator shown in FIG. 6 and the assembly unit 108 as a sub-assembly.

As shown in FIG. 6, the process of forming an assembly unit can include the steps of forming the electrode, arranging the electrolyte, arranging the sealing material and arranging the separator.

In this embodiment, cathode slurry is first adjusted in the process of forming the electrode. The cathode slurry is prepared, for example, to have a cathode active material of 85 wt %, a conductive auxiliary agent of 5 wt % and a binder of 10 wt %, The cathode slurry obtains a desired viscosity by adding a viscosity adjusting solvent therein. The cathode active material is, for example, $LiMn_2O_4$, while the conductive auxiliary agent is acetylene black. The binder is PVDF (polyvinylidene fluoride). The viscosity adjusting solvent is NMP (N-methyl-2-pyrolidone). The cathode slurry is applied to one side surface of the collector 111 composed of stainless steel foil.

The conductive auxiliary agent, for example, may include carbon black or graphite. The binder and the viscosity adjusting solvent are not limited to PVDF and NMP.

Next, anode slurry is adjusted. The anode slurry is prepared, for example, to have an anode active material of 90 wt % and a binder of 10 wt %. The anode slurry obtains a desired viscosity by adding a viscosity adjusting solvent therein. The anode slurry is applied to another side surface of the collector 111. In this example, the anode active material is hard carbon, and the binder and the viscosity adjusting solvent are PVDF and NMP. The anode slurry is applied to another side surface of the collector 111.

Applied membranes of the cathode slurry and the anode slurry are, for example, dried by using a vacuum oven and respectively form the cathode 113 composed of the cathode active material and the anode 112 composed of the anode active material (see FIGS. 7 and 8). At this time, NMP is removed by being volatilized.

Thicknesses of the cathode 113 and the anode 112 are certainly not limited and may be set depending on the purpose of use (e.g., emphasis on power or energy) or ion conductivity.

In the process of arranging the electrolyte, the electrolytes 124 and 125 are applied to an electrode portion of the cathode 113 and the anode 112, respectively (see FIG. 9).

The electrolytes 124 and 125 are prepared, for example, to have electrolytic solution of 90 wt % and host polymer of 10 wt %. Electrolytes 124 and 125 obtain a viscosity suitable for applying by adding a viscosity adjusting solvent therein.

The electrolytic solution includes an organic solvent composed of PC (propylene carbonate) and EC (ethylene carbonate) and lithium salt ($LiPF_6$) as a support salt. The concentration of the lithium salt is, for example, 1 M.

The host polymer is, for example, PVDF-HFP (copolymer of polyvinylidene fluoride and hexafluoropropylene) containing 10% of HFP (hexafluoropropylene) copolymer. A viscosity preparing solvent is DMC (dimethyl carbonate). The viscosity preparing solvent is not limited to DMC.

With reference to FIG. 10, in the process of arranging the sealing material a first sealing material 114 is first arranged so as to extend an outer periphery in the cathode side wherein the collector 111 is exposed as well as an edge of the cathode 113. For the arrangement of the first sealing material 114, an application is made using a dispenser, for example.

Next, as shown in FIG. 11, a second sealing material 116 is arranged to extend an outer periphery in the anode side wherein the collector 111 is exposed as well as an edge of the anode 112. At this time, the second sealing material 116 is positioned so as to be opposite (and overlapped) to the first sealing material 114. For the arrangement of the second sealing material 116, for example, an application is made using a dispenser is applied. Further, the first and second sealing materials are charging materials composed of a one-liquid uncured epoxy resin in this example.

As shown in FIG. 12A, in the process of arranging the separator, the separators 121 and 122 are arranged so as to cover both the cathode side surface and the anode side surface of the collector 111. By doing so, the assembly unit 108 is formed wherein the electrolytes 124 and 125 and the separators 121 and 122 are sequentially arranged at both sides of the bipolar electrode. Further, the separators 121 and 122 are porous PE. The assembly unit 108 is a component for use in a bipolar battery.

As such, since the assembly unit 108 is arranged so as to cover both the cathode and anode side surfaces of the collector 111, the assembly unit 108 becomes a sub-assembly component packed by a separator such as PE without exposing the electrode and electrolyte. To this end, delivery becomes easy without altering or deteriorating the electrode and electrolyte. Further, since the sub-assembly components are stacked upon one another in the following process, a stacking operation becomes very easy.

Further, the assembly unit (sub-assembly) 108 can be housed in a vacuum container or suctioned from the edges of the separators at both sides by using a vacuum cup. Since the bubble can be exhausted from the electrolytes 124 and 125 at both sides of the bipolar electrode via the separators 121 and 122 having permeability at this time, the remaining bubble can be further limited in addition to exhausting the bubble after forming the stack 100, as is explained next.

In the process of arranging the sealing material, a charging portion is formed in a space between the collector 111 and the electrolyte layer 120. The charging material is arranged in the charging portion so as to surround the edges of the cathode 113 and the anode 112.

Further, in the process of arranging the sealing material according to certain embodiments, it is preferred that a thickness of the first sealing material 114 is predetermined to be less than a total thickness of the cathode 113 and electrolyte 124. In addition thereto, in some of these embodiments, it is preferred that a thickness of the second sealing material 116 is predetermined to be less than a total thickness of the anode 112 and electrolyte 125. Since the separators 121 and 122 contact a center portion wherein the electrolytes 124 and 125 are arranged prior to contacting the first and second sealing materials 114 and 116 arranged in the outer periphery, the remaining bubble in the inner portion surrounded by the first and second sealing materials 114 and 116 is limited.

Figure 12B:
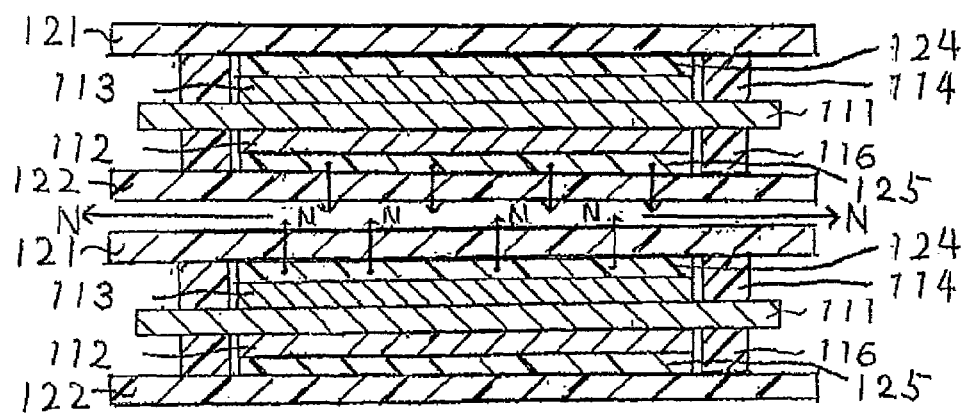
FIG. 12B is a cross-sectional view when the assembly unit shown in FIG. 12A is partially stacked in the process of forming a bonded body shown in FIG. 5.
Figure 14:
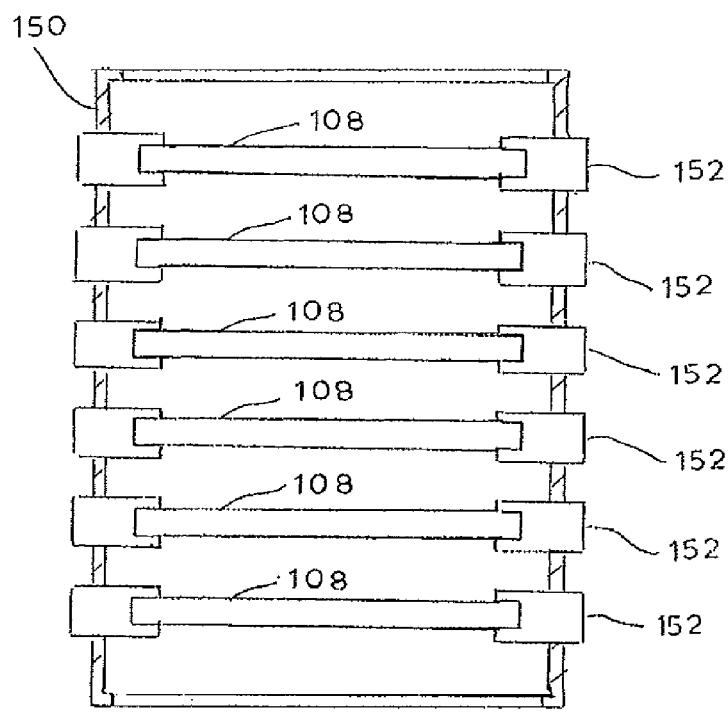
FIG. 14 is a cross-sectional view of a process for setting the assembly unit shown in FIG. 13.
Figure 15:
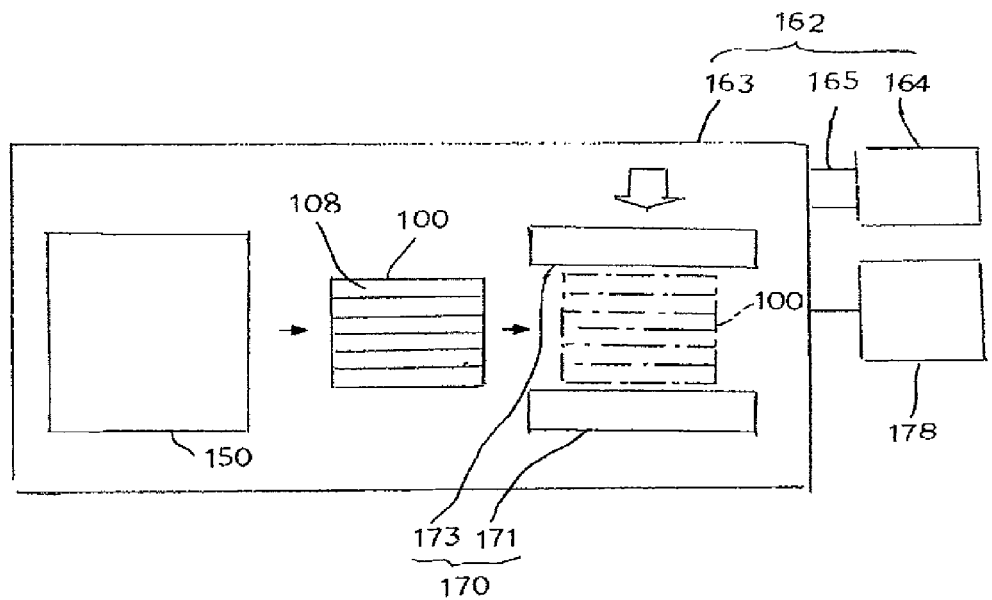
FIG. 15 is a diagram of processes for stacking and pressing as shown in FIG. 13.
Figure 16:
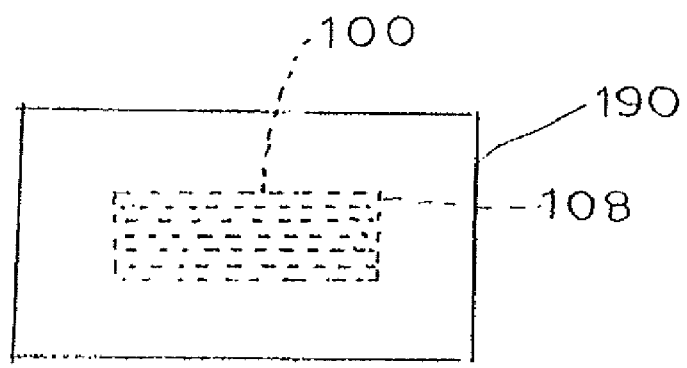
FIG. 16 is a diagram of a process for forming a sealing layer shown in FIG. 13.
Figure 17:
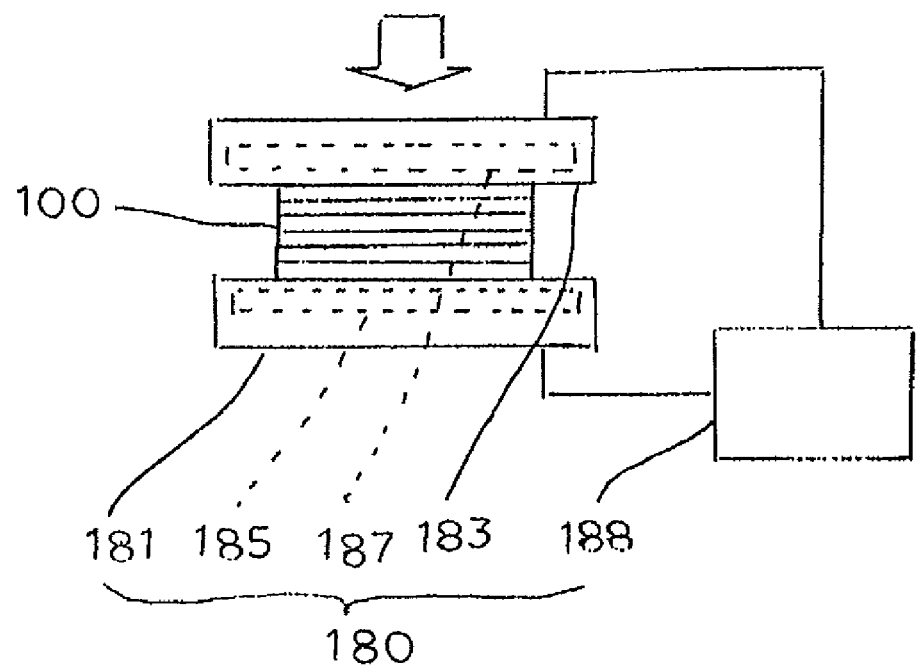
FIG. 17 is a diagram of a process for forming an interface shown in FIG. 13.
Figure 18:
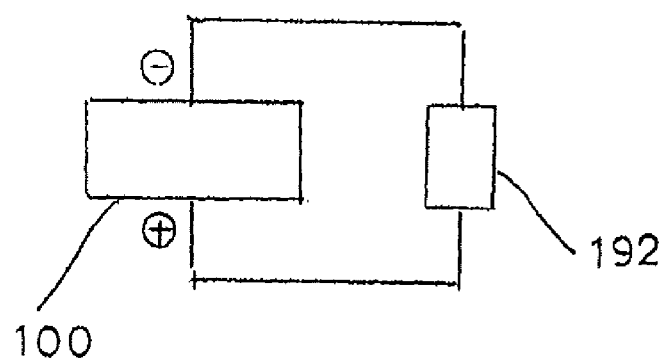
FIG. 18 is a diagram of a process for initial charging as shown in FIG. 13.

FIG. 12B is a cross-sectional view when the assembly unit 108 shown in FIG. 12A is partially stacked in the process of forming the bonded body shown in FIG. 5. FIG. 13 is a flow diagram of forming the bonded body (assembly process) shown in FIG. 5, while FIG. 14 is a cross-sectional view of a process for setting the assembly unit shown in FIG. 13. FIG. 15 is a diagram of a process for stacking the assembly unit and for pressing shown in FIG. 13. FIG. 16 is a diagram of a process for forming a sealing layer shown in FIG. 13, while FIG. 17 is a diagram of a process for forming an interface shown in FIG. 13. FIG. 18 is a diagram of a process for the initial charging shown in FIG. 13.

As shown in FIG. 13, the process of forming the bonded body comprises the steps of setting and stacking the assembly unit pressing and forming a sealing layer, forming an interface, initial charging and exhausting the bubble.

In the process of setting the assembly unit as shown in FIG. 14, the assembly units 108 (as a plurality of sub-assemblies) are sequentially set in a magazine 150. At this time, as shown in FIG. 12A, since the separators 121 and 122 are arranged at the outer sides of the electrolytes 124 and 125 and the first and second sealing materials 114 and 116 wherein the electrolytes 124 and 125 are arranged at both sides of the bipolar electrode included in the assembly unit 108, the electrolytes 124 and 125 and the first and second sealing materials 114 and 116 are not exposed to the outside. To this end, it is easy to handle the assembly unit 108 to thereby secure the preferred working property.

Referring now back to FIG. 14, in order to avoid interference when setting the assembly unit 108, the magazine 150 has a clamp mechanism 152, which is in a frame shape and is capable of embracing the outer peripheral portion of the assembly unit 108.

The clamp mechanism 152 is arranged in a stacking direction with an interspacing such that the assembly units 108 do not contact each other. The stacking direction is vertical to a surface direction of the assembly unit 108.

The clamp mechanism 152 is configured, for example, to have an elastic member composed of a spring and to be retainable and supportable when assigning a tensile force to the assembly unit 108 based on an elastic force such that corrugation is not generated. Other mechanisms to perform a clamping function are also possible. Since such mechanisms are known in the art, a detailed explanation thereof is omitted herein.

In the process of stacking the assembly unit, as shown in FIG. 15, the magazine 150 is arranged within a vacuum treatment device 160. The stack 100 of the assembly unit 108 is formed under vacuum with a range of, for example 0.2 to $0.5 \times 10^5$ Pa.

Since the electrolytes 124 and 125 and the first and second sealing materials 114 and 116 included in the assembly unit (sub-assembly) 108 are covered by the separators 121 and 122, they are not exposed to the outside. To this end, it is easy to handle the assembly unit 108 to thereby secure the working properties. Further, since the separators 121 and 122 are merely overlayed on each other, it is easy to perform a stacking operation while limiting any remaining gas bubble. Also, since the separators are overlayed on each other, corrugation is hardly generated to thereby minimize the remaining gas bubble therefrom. Since the assembly unit 108 is under vacuum, the bubble is introduced into a stacking interface of the electrode and the separator, passes through the separator and is efficiently exhausted from a space between the separators to the outside. This further reduces the remaining gas bubble.

FIG. 12B is a cross-sectional view when a part of the assembly unit 108 is stacked in the process of forming the bonded body. Although the separators 121 and 122 are overlayed on each other, FIG. 12B shows the separators 121 and 122 with a space therebetween for the sake of convenience in order to easily explain the theory on how the bubble N is exhausted. As shown in FIG. 12B, since the separators 121 and 122 (that is, two sheets) are overlayed on each other wherein the electrolytes 124 and 125 can penetrate therein, although the gas bubble N remains at the cathode side 113 or anode side 112 of the bipolar electrode, it becomes easy to exhaust the as bubble N from a surface opposite to the cathode side 113 or anode side 112 via the separators 121 and 122 having permeability. This is so that the electrolytes 124 and 125 can penetrate therein and further exhaust the gas bubble N from a space between the separators 121 and 122.

Further, as discussed above, the bubble N can be exhausted via the separators 121 and 122 even when arranged in the assembly unit 108. Optionally, the bubble N can be exhausted from a space between the separators 121 and 122 at any process after stacking the assembly unit 108 such as pressing or forming an interface. Also, the bubble N can be exhausted after being cased.

Therefore, since the dead space wherein the ion is not permeable and the electron cannot be moved is restrained, the movement of the ion and electron is not impeded during the use thereof thereby achieving high power density.

A method of forming the stack 100 comprises, for example, sequentially releasing the clamp mechanism 152 for embracing the assembly unit 108 from a lower side so as to be stacked at a rest arranged at a lower portion of the magazine 150. The method is certainly not limited thereto.

Further, in addition to sequentially releasing the clamp mechanism from a lower side to an upper side, the rest may be moved from a lower side to an upper side of the magazine 150 to stack the stack 10S nearby without being exceedingly displaced. Alternatively, the magazine may be moved from the upper side to the lower side by fastening the rest.

The vacuum treatment device 160 shown in FIG. 15 has an apparatus 162 for performing a vacuum function, an apparatus 170 for performing a pressing function and a controller 178.

The vacuuming apparatus 162 has a vacuum chamber 163, a vacuum pump 164 and a piping system 165. The vacuum chamber 163 has a detachable (openable) cover portion and a fixed base wherein the magazine 150 and the pressing apparatus 170 are arranged. The vacuum pump 164 is, for example, centrifugal and is used for forming an inner portion of the vacuum chamber 163 in a vacuum state. The piping system 165 is used for connecting the vacuum pump 164 and the vacuum chamber 163, and a leak valve (not shown) is arranged therein.

The pressing apparatus 170 has a base plate 171 and a press plate 173 spaced apart from the base plate 171. Optionally, an elastic body in a sheet-shape may be arranged on the base plate 171 and the press plate 173. The controller 178 is used for controlling the movement or pressing force of the base plate 173. The controller 178 can be, for example, a microcomputer including a random access memory (RAM), a read-only memory (ROM) and a central processing unit (CPU) in addition to various input and output connections. Generally, the control functions are performed by execution by the CPU of one or more programs stored in ROM.

As shown in FIG. 15, in the process of pressing, the stack 100 is pressed by the press plate and the base plate 171 while maintaining a vacuum state. By doing so, the first and second sealing materials 114 and 116 are prepared to form the desired thicknesses. The pressure used in this pressing is, for example, 1 to $2 \times 10^6$ Pa.

Referring now to FIG. 16, since the stack 100 is arranged in an oven 190 and then heated in the process of forming the sealing layer, the first and second sealing materials 114 and 116 included in the stack 100 may be thermally cured, thereby forming the first and second sealing layers 115 and 117. The heating condition is, for example, 80° C. Heating the stack can be performed other than in an oven.

Although a lithium secondary battery dislikes moisture, since the first and second sealing layers 115 and 117 are composed of resin, the introduction of moisture cannot be avoided. To this end, the desired thicknesses of the first and second sealing materials 114 and 116 in the process of pressing are set to reduce invading moisture by minimizing the thicknesses contacting the outer atmosphere of the first and second sealing layers 115 and 117.

Optionally, a thermoplastic resin may be applied to the first and second sealing materials 114 and 116. In such a case, the first and second sealing materials 114 and 116 are plasticized by heating to form the first and second sealing layers 115 and 117.

In the process of forming an interface, since the stack 100 is arranged in a pressing apparatus 180 and pressed under heating, the electrolytes 124 and 125 penetrate into the separators 121 and 122 included in the stack 100 and a gel interface is formed thereon as seen in FIG. 17. The heating and pressing conditions are, for example, 80° C. and 1 to $2 \times 10^6$ Pa, respectively. By doing this heating and pressing, the assembly unit 108 is stacked so that an integrated stack (bonded body) 100 can be obtained.

Here, when the electrolytes 124 and 125 penetrate into the separators 121 and 122 included in the stack 100 although the bubble N remains within the electrolytes 124 and 125 and the separators 121 and 122, the bubble N is exhausted. Namely, the bubble N is exhausted from the electrolyte 124 via the separator 121, exhausted from the electrolyte 125 via the separator 122 and exhausted from a space between the separators 121 and 122 to the outside.

The pressing apparatus 180 has a base plate 181, a press plate 183 close to but spaced apart from the base plate 181, a lower portion heating part 185, an upper portion heating part 187 and a controller 188. The lower portion heating part 185 and the upper portion heating part 187 have a resistance heating element, for example, and the two parts 185, 187 are arranged within the base plate 181 and the press plate 183 and are used to increase the temperature of the base plate 181 and the press plate 183. The controller 188, like the controller 178, is used for controlling the movement and pressing force of the press plate 183 and is also used for controlling the temperature of the lower portion heating part 185 and the upper portion heating part 187.

Optionally, either of the lower portion heating part 185 or the upper portion heating part 187 may be omitted. Alternatively, the lower portion heating part 185 and the upper portion heating part 187 may be arranged at an outer portion of the base plate 181 and the press plate 183. Further, a sheet-shaped elastic body may be arranged in the base plate 181 and the press plate 183.

As shown in FIG. 18, the operation of initially charging described with respect to FIG. 13 is performed by a charging/discharging device 192 electrically connected to the stack 100. A bubble is generated. The initial charging condition is, for example, a capacity base approximately calculated from an application weight of the cathode, such as 4 hours in 21 V-0.5 C.

Again referring to FIG. 13, in the process of exhausting the bubble, for example, the bubble in a center portion of the stack 100 is moved to the outer periphery and is then removed by pressing a roller against a surface of the stack 100. Further, since the bubble is sufficiently exhausted in the process of forming the interface, the process of exhausting the bubble is not essential. However, it is possible to improve the power density of the battery by further limiting the bubble via such a process.

In the process of casing, the integrated stack (bonded body) 100 is housed within the exterior case 104 (see FIG. 2) to thereby manufacture the bipolar battery 10 (see FIGS. 1 and 2). The exterior case 104 is formed by arranging the stack 100 between two sheet-shaped exterior materials and bonding an outer periphery of the exterior materials. The exterior materials can be polymer-metallic composite laminate film coated by an insulator such as a polypropylene film and bonded by applying a thermal fusion.

Further, it is possible to achieve the high capacity and/or high power of an additional layer of the bipolar battery by further stacking the integrated stack 100 upon another and then housing the arrangement within the exterior case 104. Optionally, it is possible to perform the processes of stacking and pressing in atmospheric conditions or the processes of forming the sealing layer and the interface under vacuum.

By appropriately selecting the electrolytes 124 and 125 and the first and second sealing materials 114 and 116, the process of forming the sealing layer and the process of forming the interface are integrated. The hardening of the first and second sealing materials 114 and 116 and the completing of the electrolyte layer are performed simultaneously. By doing so, it is possible to reduce the number of manufacturing processes. Optionally, a process of attaching a tab (lead line) for monitoring a potential of each layer (bipolar unit battery) of the stack 1000 may be added between the processes of forming the sealing layer and forming the interface.

Figure 19:
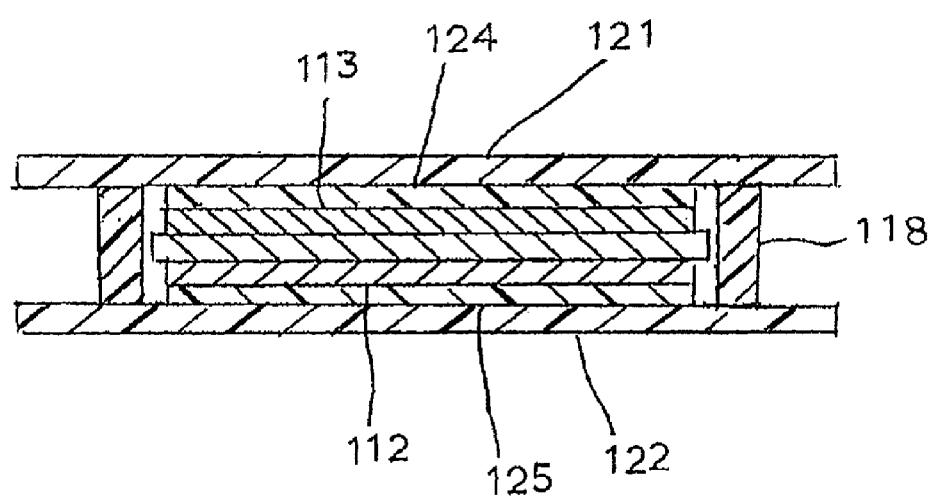
FIG. 19 is a cross-sectional of a modified example constructed in accordance with the first embodiment.

FIG. 19 is a cross-sectional view of a modified example constructed in accordance with the first embodiment. In the example of the first embodiment previously described, the first and second sealing materials 114 and 116 are arranged between the collector 111 and the separators 121 and 122 and extended to the ends of the cathode 113 and anode 112. However, a sealing structure is certainly not limited to the above. As shown in FIG. 19, for example, it is possible to arrange a sealing material 118 so as to extend to the edges of the cathode 113, the collector 111 and the anode 112.

As such, the first embodiment can provide a bipolar battery that minimizes the introduction of a bubble and a method of manufacturing such a battery.

Further, since the polymer gel electrolyte is a thermoplastic containing the electrolyte within a polymer framework, liquid leakage is prevented to thereby prevent liquid junction so as to constitute the bipolar battery having high reliability. Also, the polymer gel electrolyte is certainly not limited to thermoplastic since it may be thermosetting. In such a case, the liquid leakage is prevented by hardening the electrolyte layer by pressing under heating to thereby prevent the liquid junction.

The surface pressure in the processes of pressing and forming the interface is certainly not limited to 1 to $2\times10^6$ Pa since it may be appropriately established by considering the material properties such as the strength of materials of the stack 100. The heating temperature in the process of forming the sealing layer is not limited to 80° C. It can, for example, be anywhere within a range between 60° C. and 150° C. when considering the material properties such as the heat resistance of the electrolytic solution or the hardening temperature of the first sealing material 114 (first sealing layer 115) and the second sealing material 116 (sealing layer 117).

The electrolytes 124 and 124 are certainly not limited to the gel polymer class since they may include the electrolytic solution class. In such a case, in the process of arranging the electrolyte, for example, the electrolytic solution is applied to each electrode portion of the cathode 113 and anode 112 by using a micropipette and sank therein (see FIG. 9)

The electrolytic solution includes an organic solvent composed of propylene carbonate (PC) and ethylene carbonate (EC), a lithium salt (such as $LiPF_6$) as a support salt and a small quantity of surfactant. The concentration of the lithium salt is, for example, 1 M.

The organic solvent is certainly not limited to PC and PE since it may include other ring-type carbonate classes, chain-type carbonate classes such as dimethyl carbonate or ether classes such as tetrahyrdofuran. The lithium salt is also not limited to $LiPF_6$, since it may include other inorganic anionic salts and organic anionic salts such as $LiCF_3SO_3$.

Figure 20:
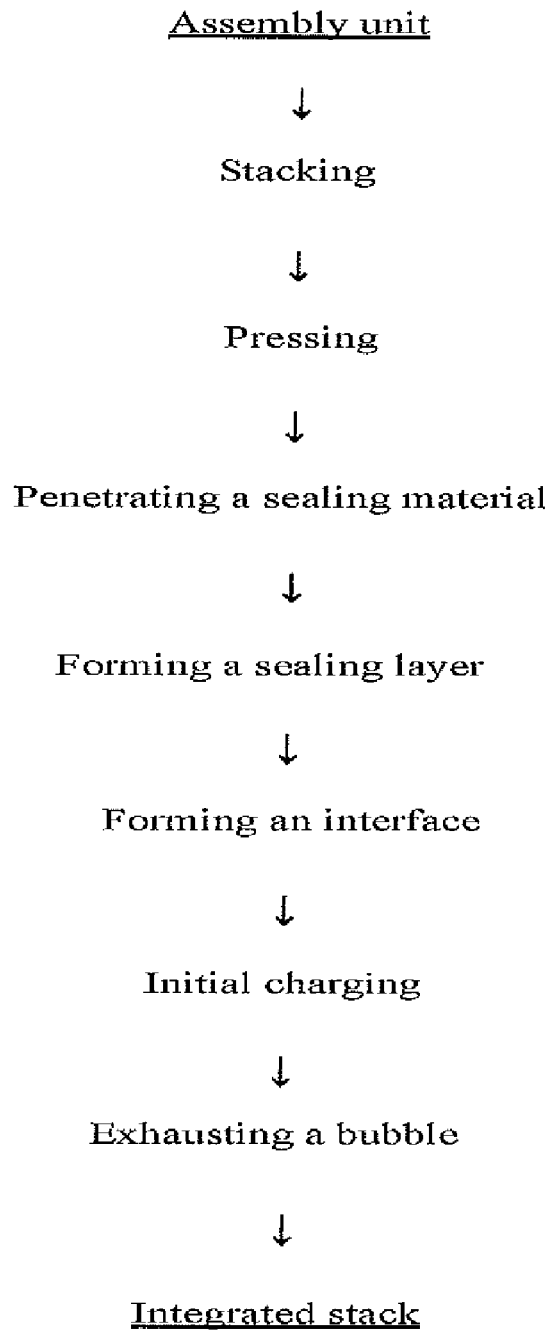
FIG. 20 is a flow diagram of a process for forming a collector in accordance with a second embodiment of the invention.
Figure 21:
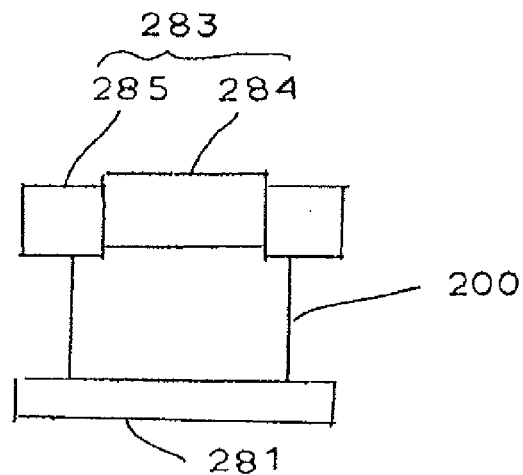
FIG. 21 is a diagram of a process for penetration of a sealing material shown in FIG. 20.

Next, the second embodiment of the invention is explained with initial reference to FIG. 20, which is a flow diagram of a process for forming a bonded body in accordance with the second embodiment. FIG. 21 is a diagram of a process for penetrating a sealing material shown in FIG. 20.

The second embodiment differs from the first embodiment in that it comprises a process of penetration of a sealing material between the processes of pressing and forming the sealing layer.

Referring now to FIG. 21, in order to limit the bubble from remaining in an inner portion surrounded by the first and second sealing materials, when the thicknesses of the first and second sealing materials are set to be less than a total thickness of the cathode and electrode and a total thickness of the anode and electrolyte, respectively, the pressing force is not sufficiently transferred to a portion (charging portion) wherein the first and second sealing materials are arranged in spite of pressing a stack 200. This causes a sealing shortage.

To this end, the first and second sealing materials are sufficiently penetrated into the separator by adding a process of penetration of the sealing material in order to press the charging portion in the stack 200 by using a pressing device 280.

In the process of forming the sealing layer, the portion into which the first and second sealing materials are penetrated is heated so as to be thermally cured. Thus, the adhesive property of the first and second sealing layers is improved compared to the first embodiment. Further, the first and second sealing materials penetrate into a portion of the separator of the manufactured bipolar battery opposite to the first and second sealing layers.

The pressing device 280 has a base plate 281 in which the stack 200 is arranged, a press plate 283 close to but spaced apart from the base plate 281 and a controller similar to controllers 178 and 188 so not shown in FIG. 21. The press plate 283 is divided to have a center press plate 284 and an outer periphery press plate 285.

The center press plate 284 is used for supporting a portion of the stack 200 wherein an electrode portion (i.e., the cathode and anode) is arranged. The outer periphery press plate 285 is used for pressing a charging portion of the stack 200. The controller is used for controlling the movements or pressing force of the center press plate 284 and the outer periphery press plate 285. Therefore, the pressing device 280 is capable of pressing only the charging portion by using the outer periphery press plate 285 of the stack 200 arranged in the base plate 281.

Although not necessary, it is preferred that the pressing operation by the outer periphery press plate 285 occur after pressing the electrode portion of the stack 200 by the center press plate 284. In such a case, it is possible to move the bubble in the electrode portion to the outer peripheral portion, further minimizing the remaining bubble in the electrode portion.

As such, compared to the first embodiment, sealing properties are further improved. Further, it is possible to appropriately integrate the processes of pressing and penetrating the sealing material as necessary.

Figure 22:
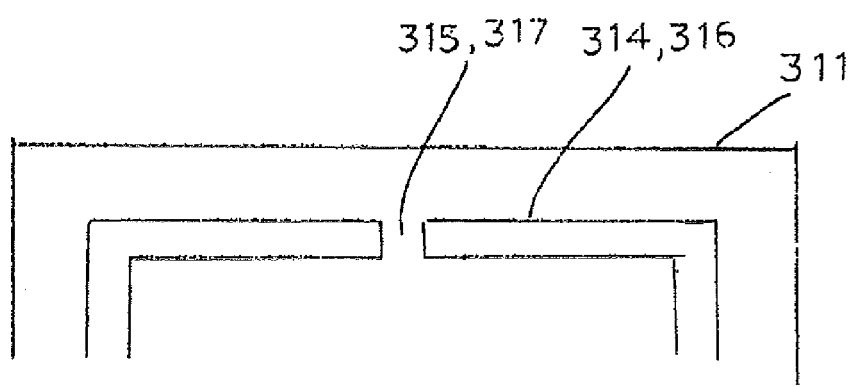
FIG. 22 is a plan view of a process for arranging a sealing material in accordance with a third embodiment of the invention.
Figure 23:
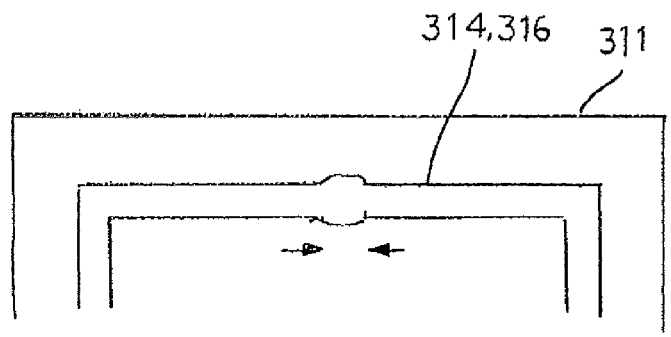
FIG. 23 is a conceptual view of a process for pressing in accordance with the third embodiment.

Next, a third embodiment of the invention is explained with reference to FIGS. 22 and 23. FIG. 22 is a plan view of a process for arranging the sealing material in accordance with the third embodiment, while FIG. 23 is a conceptual view of a process for pressing in accordance with the third embodiment.

The third embodiment differs from the first embodiment with respect to the processes of arranging the sealing material, stacking and pressing.

Referring first to FIG. 22, in the process of arranging the sealing material, first and second sealing materials 314 and 316 discontinuously extend to surround the cathode and anode. The notch-shaped gap portions 315 and 317 are formed where the first and second sealing materials 314 and 316 are not arranged. That is, the gap portion is formed in the charging portion. Further, the reference number 311 indicates a collector.

The process of stacking comprises a process of exhausting the bubble. When forming the stack, the bubble remaining in an inner space surrounded by the collector, the electrolyte layer and the first and second sealing materials 314 and 316 is exhausted via the gap portions 315 and 317

The process of pressing comprises processes of exhausting the bubble and occluding the gap. The stack is pressed along a direction that the bipolar electrode is stacked by a press plate and a base plate, such as those previously described. At this time, a portion (charging portion) in the stack is pressed wherein the first and second sealing materials 314 and 316 are arranged.

To this end, at the beginning of pressing, the bubble remaining in the inner space surrounded by the collector, the electrolyte layer and the first and second sealing materials 314 and 316 is exhausted via the gap portions 315 and 317.

Further, the first and second sealing materials 314 and 316 positioned around the gap portions 315 and 317 are directed toward the gap portions 315 and 317 by proceeding with the pressing operation as shown in FIG. 23. The gap portions 315 and 317 are occluded by coating the gap portions 315 and 317, stopping the exhausting function.

In such a case, it is possible to move the bubble in the electrode portion included in the stack to an outer periphery via the gap portions 315 and 317 until the gap portions 315 and 317 are occluded. Thus, the remaining bubble in the electrode portion is further limited.

Figure 24:
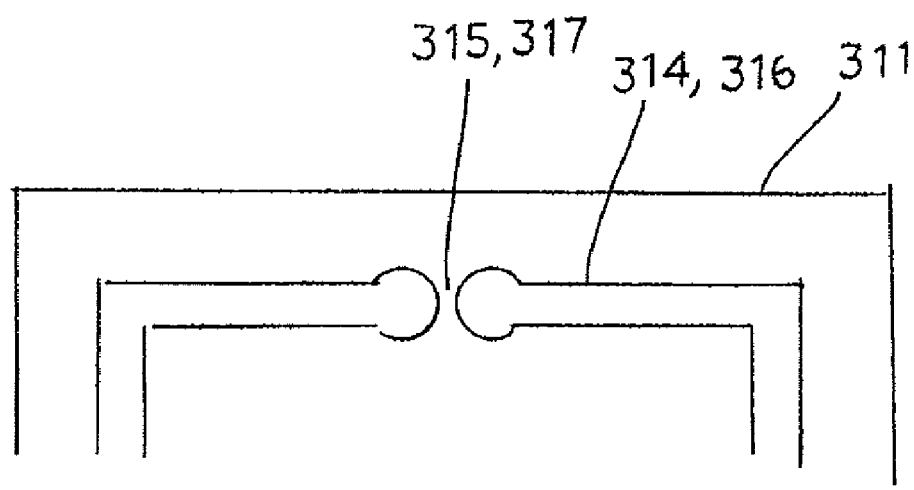
FIG. 24 is a plan view of a modified example constructed in accordance with the third embodiment.

FIG. 24 is a plan view of a modified example constructed in accordance with the third embodiment. In this modified example, the end surfaces of the first and second sealing materials 314 and 316 around the gap portions 315 and 317 have an approximately circular shape. The distance between the gap portions 315 and 317 is not constant. That is, the flow capabilities of the first and second sealing materials are improved as the amount of the first and second sealing materials 314 and 316 is increased. Further, since there is a portion wherein a space between the gap portions 315 and 317 is narrowed, it is possible to easily occlude the gap portions 315 and 317.

As mentioned above, compared to the first embodiment, the introduction of the bubble can be further limited in the third embodiment.

Further, the porous separators into which the electrolyte is penetrated are overlapped with each other in the first to third embodiments. Thus, although the bubble remains at the cathode or anode side of the bipolar electrode, it is easy to exhaust such a bubble from a surface opposite to the cathode or anode side via the separator wherein the electrolyte can penetrate therein. Further, it is also easy to exhaust the bubble from a space between the separators.

Also, although the cathode and anode are positioned at both sides of the bipolar electrode, the separators are arranged at both sides of the cathode and anode. To this end, the separators are arranged at both sides of the cathode and anode to thereby form a unit. This is so that the unit can be stacked by being covered and retained by the separator without exposing the cathode, the anode and the electrolyte. Thus, corrugation is hardly generated in the separator, and the stacking operation becomes easy, facilitating mass production.

Further, since the separators wherein the electrolyte can penetrate are overlapped with each other, although a redundant penetrating portion (i.e., micro-crack) is generated in a part of the separator, the cathode and anode are clearly segmented from each other due to the existence of the overlapped separators. Thus, the function of the separator is secured. Accordingly, productivity may be increased.

Also, the first to third embodiments illustrate examples of the separators wherein two separators are overlapped with each other. However, the invention is not limited thereto since it may include separators wherein three separators are overlapped with each other, for example. In such a case, it is preferable to form the separators as thin as possible in view of the power density.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A bipolar battery, comprising:
   at least two bipolar electrodes arranged in a stack, each of the bipolar electrodes including a cathode formed on one side of a collector and an anode formed on an opposed side of the collector; and
   electrolyte layers respectively stacked between the anode and cathode of directly adjacent bipolar electrodes, wherein each electrolyte layer includes a plurality of separators stacked upon one another, each of the plurality of separators having a permeability sufficient for an electrolyte to penetrate therein.

2. The bipolar battery according to claim 1 wherein each of the plurality of separators is a porous membrane.

3. A method of manufacturing a bipolar battery, comprising:
   forming a first bipolar electrode including a first cathode formed on one side of a first collector and a first anode formed on an opposed side of the first collector;
   arranging a first pair of separators on opposed sides of the first bipolar electrode such that each separator of the first pair is on opposed sides of the first bipolar electrode, each separator of the first pair of separators having a permeability sufficient for an electrolyte to penetrate therein;
   forming a second bipolar electrode including a second cathode formed on one side of a second collector and a second anode formed on an opposed side of the second collector;
   arranging a second pair of separators on opposed sides of the second bipolar electrode such that each separator of the second pair is on opposed sides of the second bipolar electrode, each separator of the second pair having a permeability sufficient for the electrolyte to penetrate therein; and
   stacking the first bipolar electrode and the second bipolar electrode such that one of the first pair of separators is in contact with one of the second pair of separators.

4. A component for use in a bipolar battery, the component comprising:
   a collector;
   a cathode formed on one side of the collector;
   an anode formed on an opposite side of the collector;
   an electrolyte provided on respective surfaces of the anode and the cathode opposite the collector;
   a first separator layered on the electrolyte on the anode;
   a second separator layered on the electrolyte on the cathode; and
   charging material filling a space between peripheral edges of the collector and the separators such that the charging material peripherally surrounds the cathode and the anode, wherein the component is stacked with a second component so that the first separator of the component is in contact with a second separator of the second component.

5. The component according to claim 4 wherein each of the separators is a porous membrane.

6. The bipolar battery according to claim 1 wherein the electrolyte layers are arranged at cathode and anode sides of each of the bipolar electrodes; and wherein the separators of directly adjacent ones of the electrodes are overlapping.

7. The bipolar battery according to claim 6 wherein each electrolyte layer is a polymer gel electrolyte or an electrolytic solution, the bipolar battery further comprising:
   a charging portion including a charging material arranged in a space between each collector and a directly adjacent separator and surrounding ends of an associated cathode and anode.

8. The bipolar battery according to claim 7 wherein each electrolyte layer is the polymer gel electrolyte; and wherein a thickness of the charging portion is less than a thickness between a directly adjacent cathode or anode and the polymer gel electrolyte.

9. The method according to claim 3, further comprising:
   forming an electrolyte layer adjacent each of the first pair of separators and the second pair of separators and interposed at cathode and anode sides of each of the first and the second bipolar electrodes, the electrolyte layer including the electrolyte.

10. The method according to claim 9 wherein the electrolyte of each electrolyte layer is a polymer gel electrolyte or an electrolytic solution, the method further comprising:
    prior to stacking, arranging a sealing material for forming a charging portion and arranging a charging material in a space between the first collector and each of the first pair of separators to surround edges of the first cathode and the first anode.

11. The method according to claim 10 wherein the electrolyte is the polymer gel electrolyte, and wherein a thickness of the charging portion is less than a thickness between the first cathode or first anode and the polymer gel electrolyte.

* * * * *